United States Patent
Toriumi

(10) Patent No.: US 10,654,376 B2
(45) Date of Patent: May 19, 2020

(54) FUEL CELL SYSTEM

(71) Applicant: Toyota Jidosha Kabushiki Kaisha, Toyota-shi, Aichi-ken (JP)

(72) Inventor: Keiichi Toriumi, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 21 days.

(21) Appl. No.: 16/224,090

(22) Filed: Dec. 18, 2018

(65) Prior Publication Data

US 2019/0193589 A1 Jun. 27, 2019

(30) Foreign Application Priority Data

Dec. 26, 2017 (JP) ................. 2017-248727

(51) Int. Cl.
| | | |
|---|---|---|
| *B60L 58/40* | (2019.01) | |
| *H01H 47/00* | (2006.01) | |
| *H01M 8/04537* | (2016.01) | |
| *H01M 8/04858* | (2016.01) | |
| *H01M 16/00* | (2006.01) | |

(52) U.S. Cl.
CPC ........... *B60L 58/40* (2019.02); *H01H 47/002* (2013.01); *H01M 8/04567* (2013.01); *H01M 8/04597* (2013.01); *H01M 8/04873* (2013.01); *H01M 16/006* (2013.01); *B60L 2240/547* (2013.01); *B60L 2240/549* (2013.01); *B60Y 2200/91* (2013.01); *B60Y 2400/112* (2013.01); *B60Y 2400/202* (2013.01); *B60Y 2400/3086* (2013.01); *B60Y 2400/61* (2013.01); *H01M 2220/20* (2013.01); *H01M 2250/20* (2013.01)

(58) Field of Classification Search
CPC . B60L 58/49; B60L 2240/547; H01H 47/002; H01H 47/00; H01M 8/04567; H01M 8/04597; H01M 8/04873; H01M 16/006; H01M 8/04537; H01M 8/04558; H01M 16/00
See application file for complete search history.

(56) References Cited

FOREIGN PATENT DOCUMENTS

JP 2017-098061 A 6/2017

*Primary Examiner* — Robert L Deberadinis
(74) *Attorney, Agent, or Firm* — Dinsmore & Shohl LLP

(57) ABSTRACT

A fuel cell system includes: a converter that boosts a voltage input from a fuel cell; a voltage control device that can control a voltage input from an electricity storage unit; a drive circuit that converts direct-current electricity input from the converter and the voltage control device into alternating-current electricity and outputs the converted electricity to the load; a relay that switches between a connected state in which the fuel cell and the drive circuit are connected to each other and a disconnected state in which they are disconnected from each other; and a controller that determines whether the relay is welded by different determination methods using an index current value between the relay and the fuel cell and a first index voltage value between the relay and the converter when the fuel cell system is to be stopped.

3 Claims, 7 Drawing Sheets

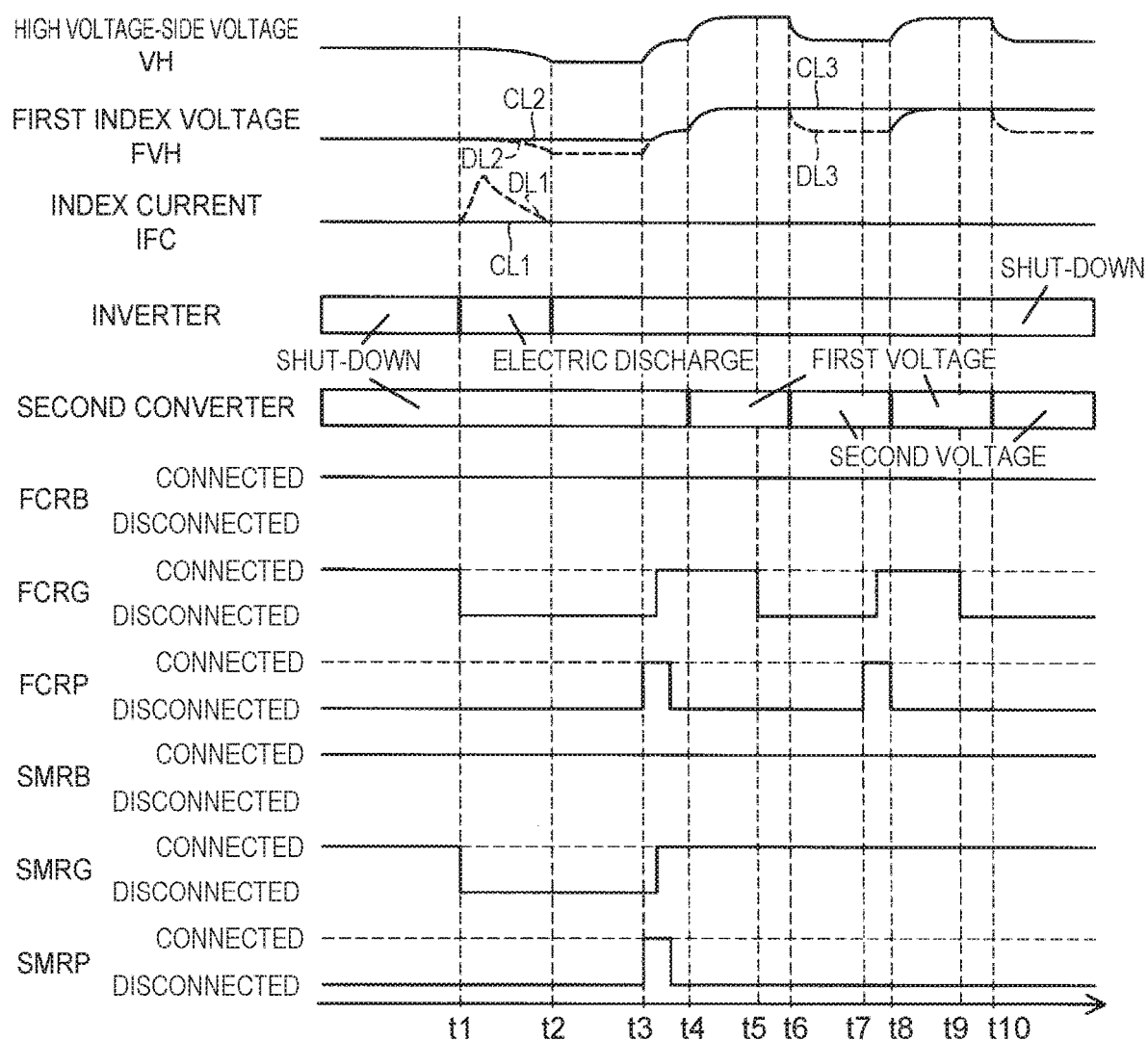

FUEL CELL SYSTEM

CROSS-REFERENCE TO RELATED APPLICATIONS

This application claims priority to Japanese Patent Application No. 2017-248727 filed on Dec. 26, 2017, which is incorporated herein by reference in its entirety including the specification, drawings and abstract.

BACKGROUND

1. Technical Field

The present disclosure relates to a fuel cell system.

2. Description of Related Art

A configuration of a fuel cell system is known in which a relay that switches between electrical connection and disconnection is provided between a fuel cell that generates electricity by receiving a supply of a fuel gas and a power controller that controls a load, such as a drive motor, by receiving a supply of electricity from the fuel cell. The relay is typically provided on each of positive and negative lines of a direct-current power source. Some such fuel cell systems perform a process of determining whether a relay contact (hereinafter may also be referred to simply as a relay) is welded at the time of starting or stopping the fuel cell (see Japanese Patent Application Publication No. 2017-98061 (JP 2017-98061 A)).

SUMMARY

In the fuel cell system of JP 2017-98061 A, when electricity generation of the fuel cell is to be stopped, the relay on one of power source lines is switched off and a load, such as the drive motor, is operated through a power controller by way of trial. If the relay on one side that has been switched off is not welded, electricity from the fuel cell side is not supplied to the power controller. Therefore, a voltage in the power source lines on the power controller side uses up electric charge in a built-in capacitor and rapidly decreases. If the relay is welded, electricity is supplied from the fuel cell continuously for a while, so that the voltage in the power source lines of the power controller decreases more slowly than if the relay is not welded. Thus, it is possible to determine whether the relay has a welding failure by determining this voltage. It is also possible to detect whether a welding failure of the relay has occurred by detecting, instead of the voltage, a current flowing from the fuel cell side to the power controller side after the relay is switched off.

Such a fuel cell system is excellent in that it can detect a welding failure of the relay that cuts off the fuel cell side and the power controller side from each other. However, there has been a desire to further enhance the accuracy of detecting a welding failure of a relay.

(1) An aspect of the present disclosure relates to a fuel cell system including: a fuel cell; a converter that boosts a voltage input from the fuel cell and outputs the boosted voltage; an electricity storage unit configured to store electricity; a voltage control device that is connected to a line on an output side of the converter and configured to be able to control a voltage input from the electricity storage unit and supply the voltage to the line; a drive circuit that is connected to the line and drives a load; a relay that is disposed between the converter and a position at which the voltage control device is connected to the line, and switches between an electrical connected state in which the fuel cell and the drive circuit are connected to each other and an electric disconnected state in which the fuel cell and the drive circuit are connected from each other; an index current acquisition unit configured to acquire an index current value between the relay and the fuel cell; a first index voltage acquisition unit configured to acquire a first index voltage value between the relay and the converter; and a controller. The controller is configured to: when the fuel cell system is to be stopped, make an initial current determination of determining whether the relay is welded, by creating a state where electricity is not supplied from the voltage control device and disconnecting the relay, and then comparing a first set value and the index current value that is acquired after transmitting a signal to the drive circuit to cause the load to discharge electricity; when the initial current determination finds that the index current value does not exceed the first set value, determine that the relay is not welded; when the initial current determination finds that the index current value is equal to or larger than the first set value, deem it indeterminable that the relay is not welded, and make a re-determination by creating a state where electricity is supplied from the voltage control device and connecting the relay to shift a high voltage-side voltage between the voltage control device and the drive circuit to a first state of having been boosted to a first voltage, and then disconnecting the relay while maintaining the state where electricity is supplied from the voltage control device to shift the high voltage-side voltage to a second state of having been stepped down to a second voltage lower than the first voltage, and then comparing a second set value and a first difference that is a difference between the first index voltage value in the first state and the first index voltage value in the second state; and when the re-determination finds that the first difference is equal to or larger than the second set value, determine that the relay is welded. According to this aspect, whether the relay is welded is determined by the initial current determination using the index current value acquired by the index current acquisition unit and the re-determination using the first index voltage value acquired by the first index voltage acquisition unit. Thus, whether the relay is welded is determined by the different determinations respectively using the index current acquisition unit and the first index voltage acquisition unit, which can enhance the accuracy of detecting a welding failure of the relay. Moreover, the time taken to determine whether the relay is welded can be shortened, since the controller does not make the re-determination when the index current value does not exceed the first set value.

(2) The above fuel cell system may further include a second index voltage acquisition unit configured to acquire a second index voltage value between the fuel cell and the converter. The controller may be configured to: when the fuel cell system is to be stopped, make a comparative determination of comparing the second index voltage value and a third set value at a timing of after creating a state where electricity is not supplied from the voltage control device and disconnecting the relay and before making the initial current determination; when the comparative determination finds that the second index voltage value is equal to or larger than the third set value, make the initial current determination; when the comparative determination finds that the second index voltage value does not exceed the third set value, make an initial voltage determination of determining whether the relay is welded by comparing a fourth set value and a second difference that is a difference between the first index voltage values before and after electric discharge in response to the signal; when the initial voltage determination finds that the second difference does not exceed the fourth set value, determine that the relay is not welded; and when the initial voltage determination finds that the second difference is equal to or larger than the fourth set value, deem it indeterminable that the relay is not welded, and make the re-determination. According to this aspect, when it is highly probable that, due to a low output voltage of the fuel cell, a current flows only within a range in which the current detection accuracy of the index current acquisition unit is low, the initial voltage determination that is a determination using the first index voltage value is made. Thus, whether the relay is welded is determined by the initial voltage determination and the re-determination that are different determinations using the first index voltage value, which can enhance the accuracy of detecting a welding failure of the relay. Moreover, the time taken to determine whether the relay is welded can be shortened, since the controller does not make the re-determination when the first index voltage value does not exceed the fourth set value.

(3) The above fuel cell system may further include a notification unit that is configured to give a notification that the relay is welded. The controller may be configured to cause the notification unit to give the notification that the relay is welded when the controller determines that the relay is welded. According to this aspect, a user who uses the fuel cell system can learn that the relay is welded.

The present disclosure can also be implemented in various other forms than the fuel cell system. For example, the disclosure can be implemented in forms such as a welding determination method of a relay in a fuel cell system installed in a vehicle, a control device that executes this welding determination method, a computer program that implements this welding determination method, a recording medium recording this computer program, and a mobile body equipped with the fuel cell system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a timing chart illustrating changes in state up to the end of the welding determination process.

DETAILED DESCRIPTION OF EMBODIMENTS

A. First Embodiment

A1. Device Configuration

Figure 1:
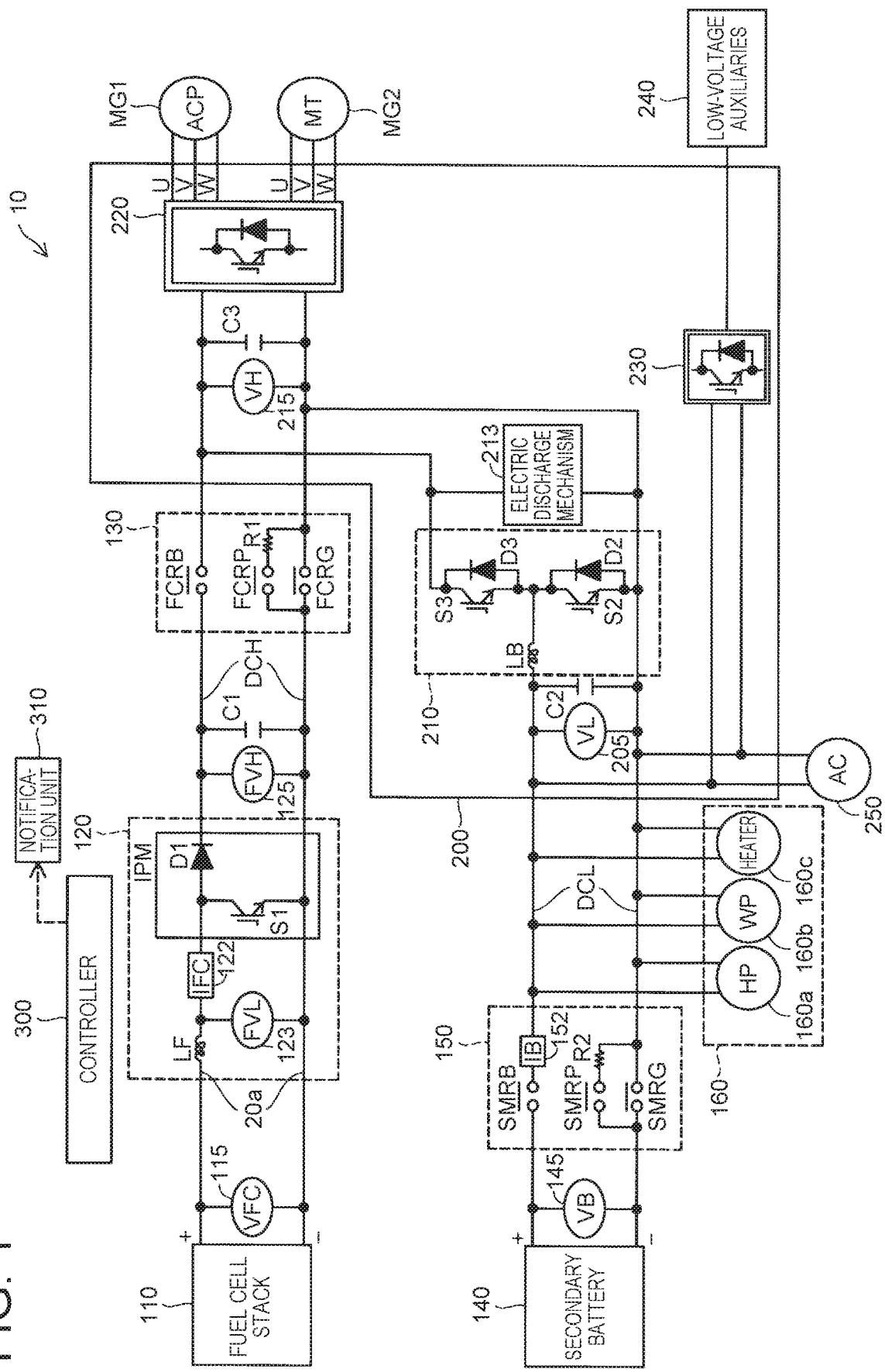
FIG. 1 is a diagram showing the configuration of a fuel cell system of a first embodiment.

FIG. 1 is a diagram showing the configuration of a fuel cell system 10 of a first embodiment of the present disclosure. The fuel cell system 10 is installed in a vehicle and supplies electricity to loads including an air compressor MG1 and a drive motor MG2 to be described later. The fuel cell system 10 includes a fuel cell 110, a voltage sensor 115, a first converter 120, a first index voltage sensor 125, a first capacitor C1, an FC relay 130, a secondary battery 140, a voltage sensor 145, a secondary battery relay 150, high-voltage auxiliaries 160, a PCU 200, low-voltage auxiliaries 240, an air conditioning compressor 250, the air compressor MG1, a controller 300, and a notification unit 310. The PCU is short for a power control unit. The fuel cell system 10 is electrically connected to the drive motor MG2 as an external load. In another embodiment, the drive motor MG2 may be a component of the fuel cell system 10.

The fuel cell 110 has a stack structure in which a plurality of single cells is stacked. Each single cell is formed by joining an anode and a cathode respectively to both sides of a proton-conducting electrolyte membrane and sandwiching this membrane-electrode assembly between separators. The fuel cell 110 receives a supply of a hydrogen gas and air and generates electricity through electrochemical reactions between hydrogen and oxygen.

The voltage sensor 115 is disposed between the fuel cell 110 and the first converter 120. The voltage sensor 115 measures a voltage VFC output by the fuel cell 110. The voltage sensor 115 inputs a signal indicating the voltage value VFC into the controller 300.

The first converter 120 boosts a voltage input from the fuel cell 110 and outputs the boosted voltage. The first converter 120 is electrically connected through lines DCH to an inverter 220 constituting a part of the PCU 200. The first converter 120 includes a reactor LF, an index current sensor 122, a low voltage-side voltage sensor 123, and a power module IPM.

The reactor LF is electrically connected to the fuel cell 110. The reactor LF is composed of an annular core and a coil wound around an outer circumference of the core. The reactor LF can store electricity and discharge the stored electricity. Electricity storing and discharging actions of the reactor LF are used by the first converter 120 to boost a voltage.

The index current sensor 122 is disposed between the reactor LF and the power module IPM. The index current sensor 122 inputs a signal indicating an index current value IFC of a current flowing from the reactor LF to the power module IPM into the controller 300.

The low voltage-side voltage sensor 123 is disposed between the reactor LF and the index current sensor 122. The low voltage-side voltage sensor 123 inputs a signal indicating the voltage value FVL into the controller 300.

The power module IPM includes a switching element S1 and a diode D1. The switching element S1 performs periodical switching control when a voltage is input from the fuel cell 110, and thereby causes the reactor LF to periodically and repeatedly store and discharge electricity. The electricity discharged by the reactor LF is output through the diode D1. The diode D1 is a so-called switching diode.

The first index voltage sensor 125 is disposed between the first converter 120 and the FC relay 130. The first index voltage sensor 125 inputs a signal indicating a first index voltage value FVH of a voltage between the first converter 120 and the FC relay 130 into the controller 300.

The first capacitor C1 is disposed between the first converter 120 and the FC relay 130. The first capacitor C1 smoothes a pulsating current contained in a direct-current voltage between the first converter 120 and the FC relay 130.

The FC relay 130 is disposed between the first converter 120 and a position at which the second converter 210 constituting a part of the PCU 200 is connected to the lines DCH. The FC relay 130 switches between a connected state in which the fuel cell 110 and the PCU 200 are electrically connected to each other and a disconnected state in which the fuel cell 110 and the PCU 200 are electrically disconnected from each other.

The FC relay 130 has: an FC first main relay FCRB including a contact that switches electrical connection of a positive-side power source line of the first converter 120; an FC second main relay FCRG including a contact that switches electrical connection of a negative-side power source line of the first converter 120; and an FC pre-charge relay FCRP that bypasses the FC second main relay FCRG through a limiting resistor R1. All of these three relays are normally open relays. The FC pre-charge relay FCRP is connected in parallel to the FC second main relay FCRG.

At the start of the fuel cell system 10, the FC first main relay FCRB is connected and then the FC pre-charge relay FCRP is connected. The first capacitor C1 is charged and the FC second main relay FCRG is connected, and then the FC pre-charge relay FCRP is disconnected. When the fuel cell system 10 is in operation, the fuel cell 110 and the PCU 200 are electrically connected to each other through the FC first main relay FCRB and the FC second main relay FCRG of the FC relay 130.

The secondary battery 140 functions as a power source of the fuel cell system 10 along with the fuel cell 110. The secondary battery 140 is a lithium-ion battery. In another embodiment, the secondary battery 140 may be another type of battery, such as a lead-acid storage battery, a nickel-cadmium battery, or a nickel-metal hydride battery. The secondary battery 140 is electrically connected through the lines DCL to the second converter 210 constituting a part of the PCU 200. In this embodiment, the secondary battery 140 can be regarded as a subordinate concept of the electricity storage unit described in SUMMARY.

The voltage sensor 145 is disposed between the secondary battery 140 and the secondary battery relay 150. The voltage sensor 145 inputs a signal indicating a voltage value VB of a voltage output by the secondary battery 140 into the controller 300.

The secondary battery relay 150 is disposed between the secondary battery 140 and the second converter 210 constituting a part of the PCU 200. The secondary battery relay 150 switches between a connected state in which the secondary battery 140 and the PCU 200 are electrically connected to each other and a disconnected state in which the secondary battery 140 and the PCU 200 are electrically disconnected from each other.

The secondary battery relay 150 has: a secondary battery first main relay SMRB including a contact that switches electrical connection of a positive-side power source line of the secondary battery 140; a secondary battery second main relay SMRG including a contact that switches electrical connection of a negative-side power source line of the secondary battery 140; a secondary battery pre-charge relay SMRP that bypasses the secondary battery second main relay SMRG through a limiting resistor R2; and a current sensor 152. All of these three relays are normally open relays. The secondary battery pre-charge relay SMRP is connected in parallel to the secondary battery second main relay SMRG. The current sensor 152 is disposed between the secondary battery first main relay SMRB and the PCU 200. The current sensor 152 inputs a signal indicating a current value IB of a current flowing between the secondary battery first main relay SMRB and the PCU 200 into the controller 300.

At the start of the fuel cell system 10, the secondary battery first main relay SMRB is connected and then the secondary battery pre-charge relay SMRP is connected. The second capacitor C2 is charged and then the secondary battery second main relay SMRG is connected, and then the secondary battery pre-charge relay SMRP is disconnected. When the fuel cell system 10 is in operation, the secondary battery 140 and the PCU 200 are electrically connected to each other through the secondary battery first main relay SMRB and the secondary battery second main relay SMRG of the secondary battery relay 150.

The high-voltage auxiliaries 160 are connected to a part of the lines DCL between the secondary battery relay 150 and the PCU 200. The high-voltage auxiliaries 160 are loads that require high voltages to drive. The high-voltage auxiliaries 160 include a hydrogen pump 160a, a coolant pump 160b, and a coolant heater 160c.

The PCU 200 includes a low voltage-side voltage sensor 205, a second capacitor C2, a second converter 210, an electric discharge mechanism 213, a high voltage-side voltage sensor 215, a third capacitor C3, an inverter 220, and a step-down converter 230.

The low voltage-side voltage sensor 205 is disposed between the secondary battery relay 150 and the second converter 210. The low voltage-side voltage sensor 205 inputs a signal indicating a voltage value VL into the controller 300.

The second capacitor C2 is disposed between the secondary battery relay 150 and the second converter 210. The second capacitor C2 smoothes a pulsating current contained in a direct-current voltage between the secondary battery relay 150 and the second converter 210.

The second converter 210 is connected to the lines DCH. The second converter 210 boosts a voltage input from the secondary battery 140 and outputs the boosted voltage to the lines DCH. In this embodiment, the second converter 210 can be regarded as a subordinate concept of the voltage control device described in SUMMARY. The second converter 210 includes a reactor LB, switching elements S2, S3, and diodes D2, D3.

The reactor LB is electrically connected to the secondary battery 140. The reactor LB has the same configuration as the reactor LF.

The switching elements S2, S3 are controlled so as to switch on and off in turns. When the switching element S2 is on, the switching element S3 is off, and when the switching element S2 is off, the switching element S3 is on. By adjusting the duty ratio of switching on and off of the switching elements S2, S3, the second converter 210 boosts a voltage input from the secondary battery 140 and outputs the boosted voltage.

The diode D2 and the diode D3 are connected respectively between the collector and the emitter of the switching element S2 and between the collector and the emitter of the switching element S3 so as to allow a current to flow from the emitter side to the collector side.

The electric discharge mechanism 213 causes electrical charge stored in the second capacitor C2 to be discharged. The electric discharge mechanism 213 has a relay and a limiting resistor connected in series with this relay (neither is shown). The electric discharge mechanism 213 causes electrical charge stored in the second capacitor C2 to be discharged by connecting the relay (not shown).

The high voltage-side voltage sensor 215 is disposed between the second converter 210 and the inverter 220. The high voltage-side voltage sensor 215 inputs a signal indicating a high voltage-side voltage value VH of a voltage between the second converter 210 and the inverter 220 into the controller 300.

The third capacitor C3 is disposed between the second converter 210 and the inverter 220. The third capacitor C3 smoothes a pulsating current contained in a direct-current voltage between the second converter 210 and the inverter 220. The third capacitor C3 also smoothes a pulsating current contained in a voltage input from the fuel cell 110.

The inverter 220 is connected to the lines DCH. The inverter 220 converts direct-current electricity input from the first converter 120 and the second converter 210 into alternating-current electricity and outputs the converted electricity. The inverter 220 drives the air compressor MG1 and the drive motor MG2 by supplying the converted alternating-current electricity to the air compressor MG1 and the drive motor MG2. In this embodiment, the inverter 220 can be regarded as a subordinate concept of the drive circuit described in SUMMARY.

The step-down converter 230 is connected to the lines DCL and the low-voltage auxiliaries 240. The step-down converter 230 steps down a voltage input from the secondary battery 140 and outputs the stepped-down voltage to the low-voltage auxiliaries 240.

The low-voltage auxiliaries 240 are loads that require low voltages to drive. The low-voltage auxiliaries 240 are supplied with electricity from the step-down converter 230. Examples of the low-voltage auxiliaries 240 include an injector that is used to supply a fuel gas to the fuel cell 110, and an auxiliary battery that is a battery for auxiliaries and temporarily stores electricity.

The air conditioning compressor 250 receives a supply of electricity from the secondary battery 140 and supplies, to a heat exchanger (not shown), an air conditioning cooling medium to be used by an air conditioning device of a vehicle equipped with the fuel cell system 10.

The air compressor MG1 receives a supply of electricity from the inverter 220 and supplies compressed air to the fuel cell 110. The drive motor MG2 turns wheels of the vehicle equipped with the fuel cell system 10. The air compressor MG1 and the drive motor MG2 correspond to loads that consume electricity supplied from the fuel cell 110 and the secondary battery 140. In this embodiment, the air compressor MG1 is a component of the fuel cell system 10. Thus, the fuel cell system 10 supplies electricity to the air compressor MG1 that is an internal load and the drive motor MG2 that is an external load.

The controller 300 is composed of a plurality of ECUs. The controller 300 receives signals output from various sensors installed in the fuel cell system 10 and controls operations of the units of the fuel cell system 10.

The notification unit 310 gives a notification that the FC relay 130 is welded. When the controller 300 determines that the FC relay 130 is welded, the notification unit 310 gives a notification to that effect in response to a signal output from the controller 300. In this embodiment, the notification unit 310 gives a notification to a driver of the vehicle equipped with the fuel cell system 10.

A2. Welding Determination Process

Figure 2:
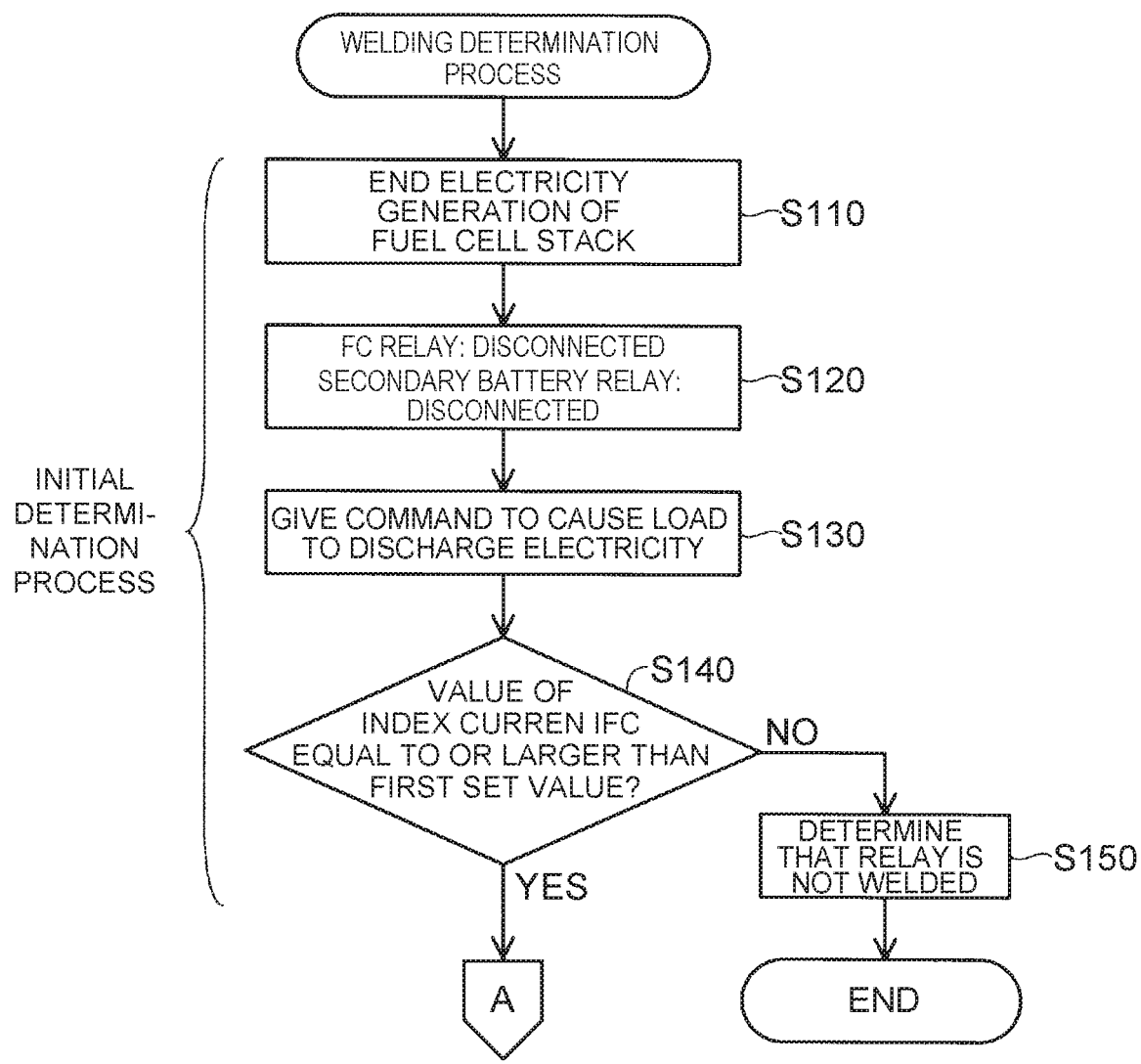
FIG. 2 is a flowchart showing a welding determination process executed by a controller.
Figure 3:
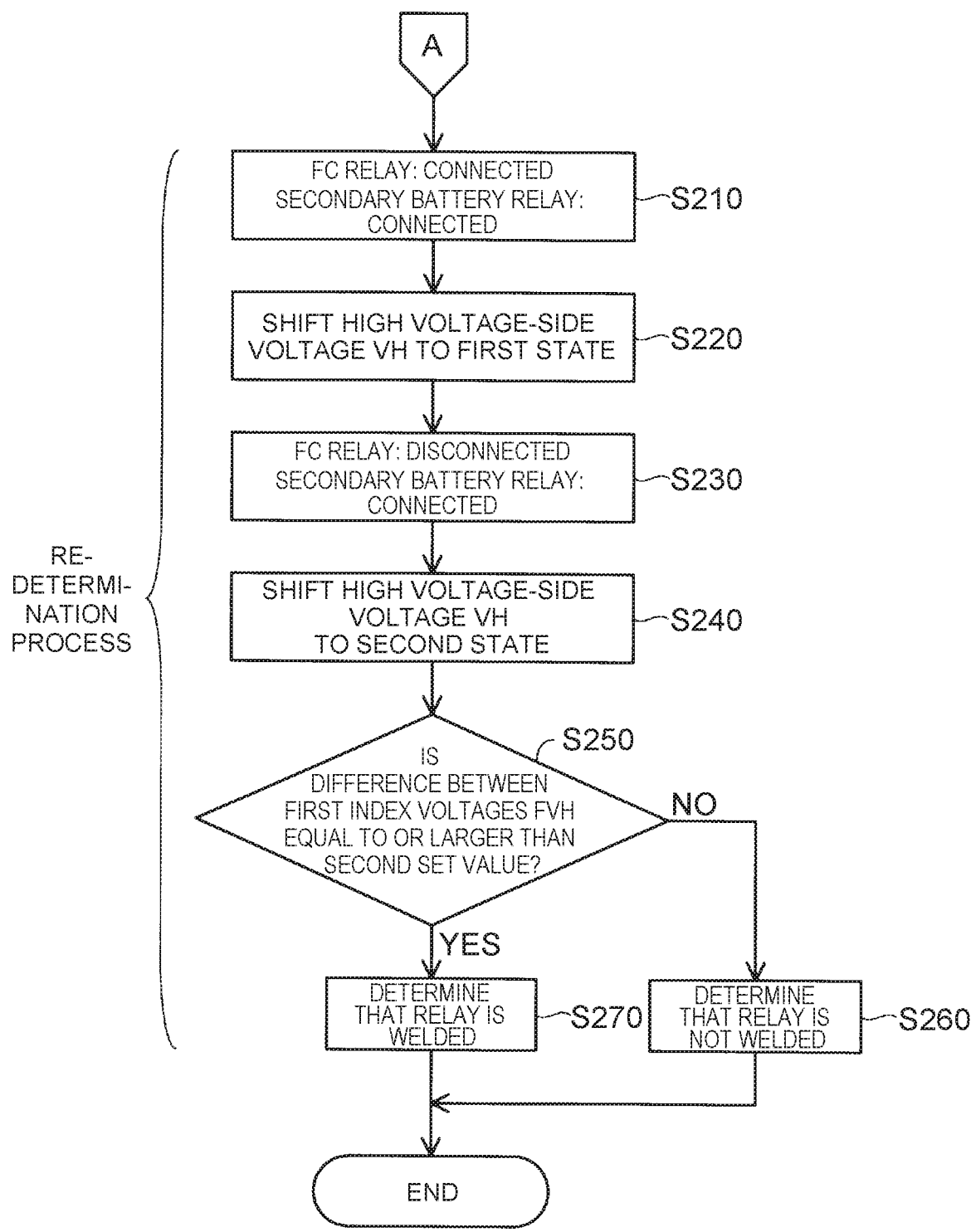
FIG. 3 is a flowchart showing the welding determination process executed by the controller.

FIG. 2 and FIG. 3 are flowcharts showing a welding determination process executed by the controller 300. The welding determination process is a process that is executed to determine whether the FC relay 130 is welded. The welding determination process is executed when the fuel cell system 10 is to be stopped. In this embodiment, whether the FC second main relay FCRG of the FC relay 130 is welded is determined by the welding determination process.

The process from step S110 to step S150 of FIG. 2 (to be referred to as an initial determination process in this embodiment) is a process with priority given to shortening the time taken to stop the fuel cell system 10 by quickly determining whether the relay is welded. The initial determination process is a process of determining whether the FC relay 130 is welded. On the other hand, the process from step S210 to step S270 of FIG. 3 (to be referred to as a re-determination process in this embodiment) is a process with priority given to the accuracy with which whether the relay is welded is determined. The re-determination process is a determination process of determining whether the FC relay 130 is welded when it is indeterminable that the FC relay 130 is not welded by the initial determination process.

A state where the fuel cell system 10 is in operation before the welding determination process is executed will be described. When the fuel cell system 10 is in operation, a hydrogen gas and air are supplied to the fuel cell 110. The FC first main relay FCRB and the FC second main relay FCRG of the FC relay 130 electrically connect the fuel cell 110 and the PCU 200 to each other. The FC pre-charge relay FCRP electrically disconnects the fuel cell 110 and the PCU 200 from each other. The secondary battery first main relay SMRB and the secondary battery second main relay SMRG of the secondary battery relay 150 electrically connect the fuel cell 110 and the PCU 200 to each other. The secondary battery pre-charge relay SMRP electrically disconnects the fuel cell 110 and the PCU 200 from each other.

As shown in FIG. 2, when the welding determination process is started, the controller 300 ends electricity generation of the fuel cell 110 (step S110). The controller 300 ends electricity generation of the fuel cell 110 by stopping the supply of a hydrogen gas and air to the fuel cell 110. In this case, the controller 300 stops the first converter 120, the second converter 210, and the inverter 220. That the first converter 120, the second converter 210, and the inverter 220 are stopped here means that all the switching elements constituting parts of the first converter 120, the second converter 210, and the inverter 220 are switched off.

The controller 300 disconnects the FC relay 130 and the secondary battery relay 150 (step S120). "Disconnected" here means a state where electrical connection through the FC relay 130 and the secondary battery relay 150 is interrupted. In this embodiment, turning off the second converter 210 and disconnecting the secondary battery relay 150 can be regarded as a subordinate concept of "creating a state where electricity is not supplied from the voltage control device" described in SUMMARY. In another embodiment, "creating a state where electricity is not supplied from the voltage control device" may be achieved by either turning off the second converter 210 or disconnecting the secondary battery relay 150.

In this embodiment, the FC relay 130 is disconnected by electrically disconnecting the FC second main relay FCRG of the FC relay 130 while keeping the FC first main relay FCRB thereof electrically connected. The secondary battery relay 150 is disconnected by electrically disconnecting one of the secondary battery first main relay SMRB and the secondary battery second main relay SMRG of the secondary battery relay 150 while keeping the other electrically connected. In this embodiment, the secondary battery second main relay SMRG of the secondary battery relay 150 is electrically disconnected while the secondary battery first main relay SMRB thereof is kept electrically connected.

The controller 300 commands the inverter 220 to cause the drive motor MG2 that is a load to discharge electricity (step S130). The controller 300 commands the inverter 220 to perform switching control to supply alternating-current electricity to the drive motor MG2 such that no torque is generated in the drive motor MG2, and thereby causes the drive motor MG2 to discharge electricity. In another embodiment, the controller 300 may give a command to cause the air compressor MG1 to discharge electricity in addition to the drive motor MG2.

The controller 300 determines whether the FC relay 130 is welded by comparing the index current value IFC and a preset first set value (step S140). More specifically, the controller 300 makes this comparison to determine whether the index current value IFC is equal to or larger than the first set value. In this embodiment, the first set value is 1 A (ampere). In another embodiment, the first set value may be a value lower than 1 A or a value higher than 1 A. In this embodiment, the determination through the comparison in step S140 can be regarded as a subordinate concept of the initial current determination described in SUMMARY.

When the index current value IFC does not exceed the first set value (step S140: NO), the controller 300 determines that the FC relay 130 is not welded (step S150). In this case, the controller 300 does not execute the re-determination process of FIG. 3. Then, the controller 300 ends the welding determination process. In this embodiment, when the controller 300 determines that the FC relay 130 is not welded, the controller 300 does not cause the notification unit 310 to give a notification.

When the index current value IFC is equal to or larger than the first set value (step S140: YES), the controller 300 deems it indeterminable that the FC relay 130 is not welded, and executes the re-determination process of step S210 and the subsequent steps shown in FIG. 3. If the FC relay 130 has been normally disconnected in step S120, the fuel cell 110 and the PCU 200 are electrically disconnected from each other. Therefore, the index current value IFC does not rise even when the drive motor MG2 discharges electricity in step S130. However, when the index current value IFC rises to be equal to or larger than the first set value as a result of the drive motor MG2 discharging electricity, it is highly probable that the FC relay 130 has not been disconnected in step S120 due to welding of the FC second main relay FCRG. The rise of the index current value IFC is attributable to electrical charge produced by electricity generation using a hydrogen gas and air having been remaining in the fuel cell 110 at a point when the supply of a hydrogen gas and air was stopped, and electrical charge having been stored in the first capacitor C1 at that point.

When the index current value IFC is equal to or larger than the first set value (step S140: YES), as shown in FIG. 3, the controller 300 starts the re-determination process and connects the FC relay 130 and the secondary battery relay 150 (step S210). "Connected" here means a state where electrical connection through the FC relay 130 and the secondary battery relay 150 is established. The controller 300 connects the FC relay 130 and the secondary battery relay 150 by electrically connecting the FC second main relay FCRG and the secondary battery second main relay SMRG that have been electrically disconnected in the initial determination process.

The FC second main relay FCRG and the secondary battery second main relay SMRG are electrically connected in step S210 by the same procedure as at the start of the fuel cell system 10. Specifically, in the state where the FC first main relay FCRB is connected, the FC pre-charge relay FCRP is connected and the first capacitor C1 is charged, and then the FC second main relay FCRG is connected, and then the FC pre-charge relay FCRP is disconnected. In the state where the secondary battery first main relay SMRB is connected, the secondary battery pre-charge relay SMRP is connected and the second capacitor C2 is charged, and then the secondary battery second main relay SMRG is connected, and then the secondary battery pre-charge relay SMRP is disconnected.

The controller 300 shifts the high voltage-side voltage VH that is the voltage between the second converter 210 and the inverter 220 to a first state of having been boosted to a first voltage (step S220). The controller 300 boosts the high voltage-side voltage VH to the first voltage by controlling the second converter 210 using electricity supplied from the secondary battery 140. In this embodiment, the first voltage is 484 V. In another embodiment, the first voltage may be a value lower than 484 V or a value higher than 484 V. In this embodiment, connecting the secondary battery relay 150 and controlling the second converter 210 can be regarded as a subordinate concept of "creating a state where electricity is supplied from the voltage control device" described in SUMMARY.

The controller 300 disconnects the FC relay 130 while keeping the secondary battery relay 150 connected (step S230). The controller 300 disconnects the relay again that has been electrically disconnected to disconnect the FC relay 130 in step S120. In this embodiment, the controller 300 electrically disconnects the FC second main relay FCRG.

The controller 300 shifts the high voltage-side voltage VH to a second state of having been stepped down to a second voltage lower than the first voltage (step S240). The controller 300 steps down the high voltage-side voltage VH to the second voltage by controlling the second converter 210. In this embodiment, the second voltage is 384 V. In another embodiment, the second voltage may be a value lower than 384 V or a value higher than 384 V.

The controller 300 compares a preset second set value and the difference between the first index voltage value FVH in the first state and the first index voltage value FVH in the second state (step S250). More specifically, the controller 300 determines whether the difference between the first index voltage value FVH in the first state and the first index voltage value FVH in the second state is equal to or larger than the second set value. In this embodiment, the second set value is 25 V. In another embodiment, the second set value may be a value lower than 25 V or a value higher than 25 V. In this embodiment, the determination through the comparison in step S250 can be regarded as a subordinate concept of the re-determination described in SUMMARY.

When the difference between the first index voltage values FVH does not exceed the second set value (step S250: NO), the controller 300 determines that the FC relay 130 is not welded (step S260). Then, the controller 300 ends the welding determination process.

When the difference between the first index voltage values FVH is equal to or larger than the second set value (step S250: YES), the controller 300 determines that the FC relay 130 is welded (step S270). Then, the controller 300 ends the welding determination process. In this embodiment, when the controller 300 determines that the FC relay 130 is welded, the controller 300 causes the notification unit 310 to give a notification to that effect.

In the re-determination process having been described using FIG. 3, when the high voltage-side voltage VH is shifted to the first state of having been boosted to the first voltage in step S220, the first index voltage FVH that is the voltage between the first converter 120 and the FC relay 130 also rises since the FC relay 130 is connected. Then, after the FC relay 130 is disconnected in step S230, the high voltage-side voltage VH is shifted to the second state of having been stepped down to the second voltage in step S240. In this case, if the FC relay 130 has been normally disconnected, the first index voltage value FVH does not decrease even when the high voltage-side voltage VH is stepped down from the first voltage to the second voltage by shifting from the first state to the second state. However, when the difference between the first index voltage value FVH in the first state and the first index voltage value FVH in the second state becomes equal to or larger than the second set value as the high voltage-side voltage VH shifts from the first state to the second state, it is highly probable that the FC relay 130 has not been disconnected in step S230 due to welding of the FC second main relay FCRG.

Figure 4:
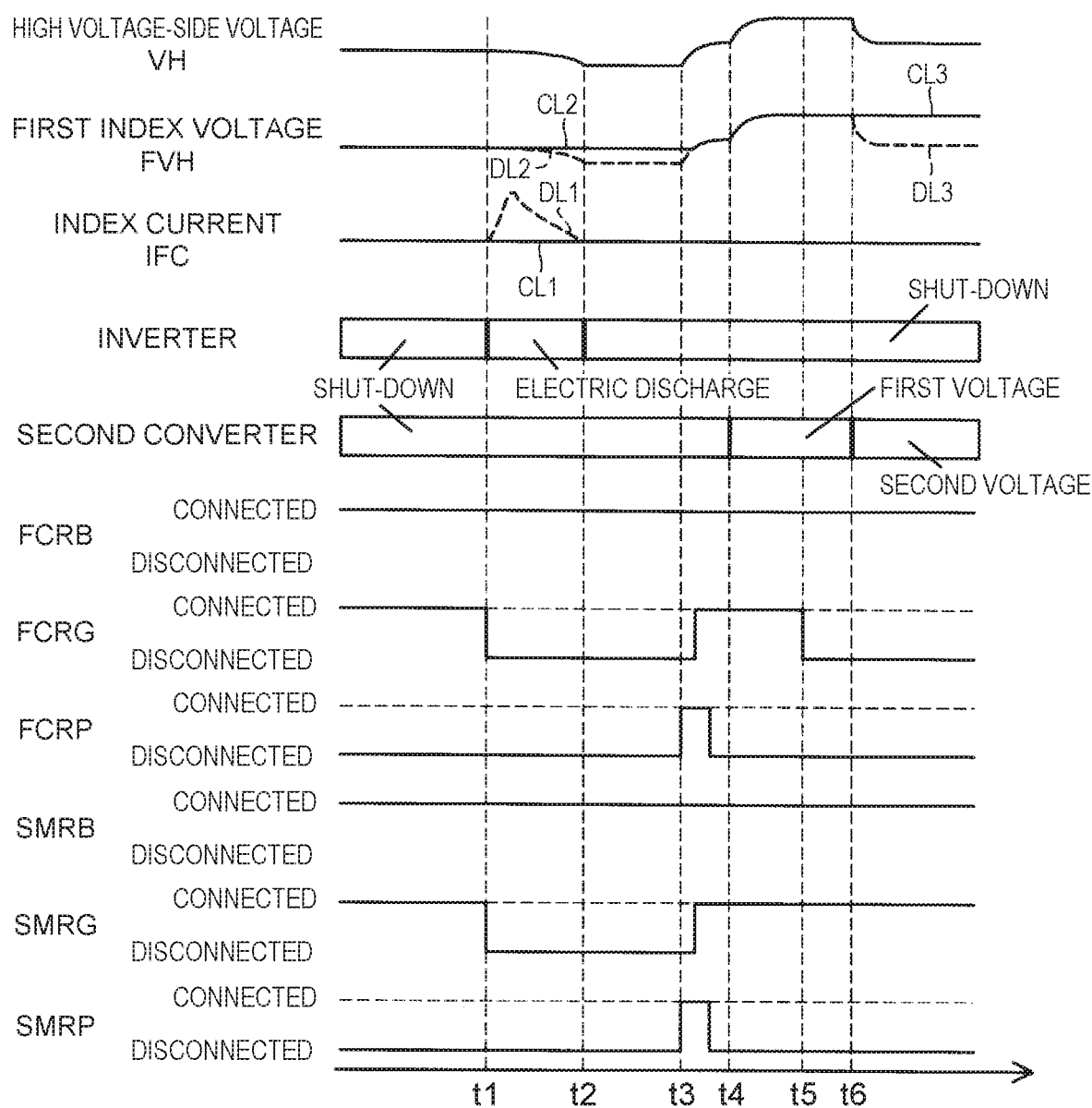
FIG. 4 is a timing chart illustrating changes in state up to the end of the welding determination process.

FIG. 4 is a timing chart illustrating changes in state from when the supply of a hydrogen gas and air to the fuel cell 110 is stopped until when the welding determination process is ended. FIG. 4 shows a time series of changes in the high voltage-side voltage VH measured by the high voltage-side voltage sensor 215, the first index voltage FVH acquired by the first index voltage sensor 125, the index current value IFC acquired by the index current sensor 122, the operation state of the inverter 220, the operation state of the second converter 210, the state of electrical connection of the FC first main relay FCRB, the FC second main relay FCRG, and the FC pre-charge relay FCRP, and the state of electrical connection of the secondary battery first main relay SMRB, the secondary battery second main relay SMRG, and the secondary battery pre-charge relay SMRP.

At timing t1 in FIG. 4, the FC relay 130 and the secondary battery relay 150 are shifted to a disconnected state (step S120) and the drive motor MG2 is caused to discharge electricity (step S130). In this case, the FC second main relay FCRG and the secondary battery second main relay SMRG are disconnected, and the drive motor MG2 starts to discharge electricity as the inverter 220 starts to perform the switching control.

During the period from timing t1 to timing t2 in FIG. 4, the index current value IFC and the first set value are compared (step S140). The solid line CL1 indicated between timing t1 and timing t2 in FIG. 4 represents a state of the index current value IFC in the case where the FC second main relay FCRG is not welded. The dashed line DL1 indicated between timing t1 and timing t2 in FIG. 4 represents a state of the index current IFC in the case where the FC second main relay FCRG is welded. The solid line CL2 indicated between timing t1 and timing t2 in FIG. 4 represents a state of the first index voltage FVH in the case where the FC second main relay FCRG is not welded. The dashed line DL2 indicated between timing t1 and timing t2 in FIG. 4 represents a state of the first index voltage FVH in the case where the FC second main relay FCRG is welded.

If the FC second main relay FCRG is not welded, the FC relay 130 has been normally disconnected in step S120, so that the index current value IFC does not rise during the period from timing t1 to timing t2 in FIG. 4 as indicated by the solid line CL1, even when the drive motor MG2 is commanded to discharge electricity in step S130. The first index voltage value FVH does not decrease either as indicated by the solid line CL2.

On the other hand, if the FC second main relay FCRG is welded, the FC relay 130 has failed to be disconnected in step S120, so that the index current value IFC rises during the period from timing t1 to timing t2 in FIG. 4 as indicated by the dashed line DL1 when the drive motor MG2 is commanded to discharge electricity in step S130. Moreover, as the index current value IFC rises, the first index voltage value FVH decreases as indicated by the dashed line DL2. The index current value IFC decreases when electrical charge having been remaining in the fuel cell 110 is consumed after the drive motor MG2 started to discharge electricity.

At timing t2 in FIG. 4, the switching control by the inverter 220 is stopped. During the period from timing t3 to timing t4 in FIG. 4, the FC relay 130 and the secondary battery relay 150 are shifted to a connected state (step S210). In this case, the FC second main relay FCRG and the secondary battery second main relay SMRG are electrically connected. Since the FC relay 130 and the secondary battery relay 150 are connected, the high voltage-side voltage VH and the first index voltage FVH rise during the period from timing t3 to timing t4.

At timing t4 in FIG. 4, the high voltage-side voltage VH starts to be shifted to the first state (step S220), and the high voltage-side voltage VH is boosted to the first voltage during the period from timing t4 to timing t5. In this case, the first index voltage FVH is also boosted since the FC relay 130 is connected.

At timing t5 in FIG. 4, the FC relay 130 is shifted to a disconnected state while the secondary battery relay 150 is kept connected (step S230). At timing t6 in FIG. 4, the high voltage-side voltage VH starts to be shifted to the second state (step S240). From timing t6 in FIG. 4, the high voltage-side voltage VH is stepped down to the second voltage.

At timing t6 or later in FIG. 4, the second set value and the difference between the first index voltage value FVH in the first state and the first index voltage value FVH in the second state are compared (step S250). The solid line CL3 indicated from timing t6 in FIG. 4 represents a state of the first index voltage value FVH in the case where the FC second main relay FCRG is not welded. The dashed line DL3 indicated from timing t6 in FIG. 4 represents a state of the first index voltage value FVH in the case where the FC second main relay FCRG is welded.

If the FC second main relay FCRG is not welded, the FC relay 130 has been normally disconnected in step S230, so that the first index voltage value FVH remains the same as indicated by the solid line CL3, even when the high voltage-side voltage VH is stepped down from the first voltage to the second voltage by shifting from the first state to the second state from timing t6 in FIG. 4. On the other hand, if the FC second main relay FCRG is welded, the FC relay 130 has failed to be disconnected in step S230, so that the first index voltage value FVH decreases so as to follow the high voltage-side voltage VH as indicated by the dashed line DL3, when the high voltage-side voltage VH is stepped down from the first voltage to the second voltage by shifting from the first state to the second state from timing t6 in FIG. 4.

According to the first embodiment having been described above, whether the FC relay 130 is welded is determined by the initial current determination using the index current value IFC acquired by the index current sensor 122 and the re-determination using the first index voltage value FVH acquired by the first index voltage sensor 125. Thus, whether the FC relay 130 is welded is determined by the different determinations respectively using the index current sensor 122 and the first index voltage sensor 125, which can enhance the accuracy of detecting a welding failure of the FC relay 130. When the index current value IFC does not exceed the first set value (step S140: NO), the controller 300 does not execute the re-determination process of FIG. 3, so that the time taken to determine whether the relay is welded can be shortened. As a result, the fuel cell system 10 can be stopped in a shorter time.

According to the first embodiment described above, the driver of the vehicle equipped with the fuel cell system 10 can learn that the FC relay 130 is welded through a notification given by the notification unit 310.

B. Second Embodiment

B1. Device Configuration

A fuel cell system of a second embodiment will be described. The configuration of the fuel cell system of the second embodiment is the same as the device configuration of the fuel cell system 10 of the first embodiment. The same reference signs as in the first embodiment denote the same components, for which the preceding description is to be referred to. The fuel cell system of the second embodiment is different in the processing contents of the welding determination process executed by the controller 300.

B2. Welding Determination Process

Figure 5:
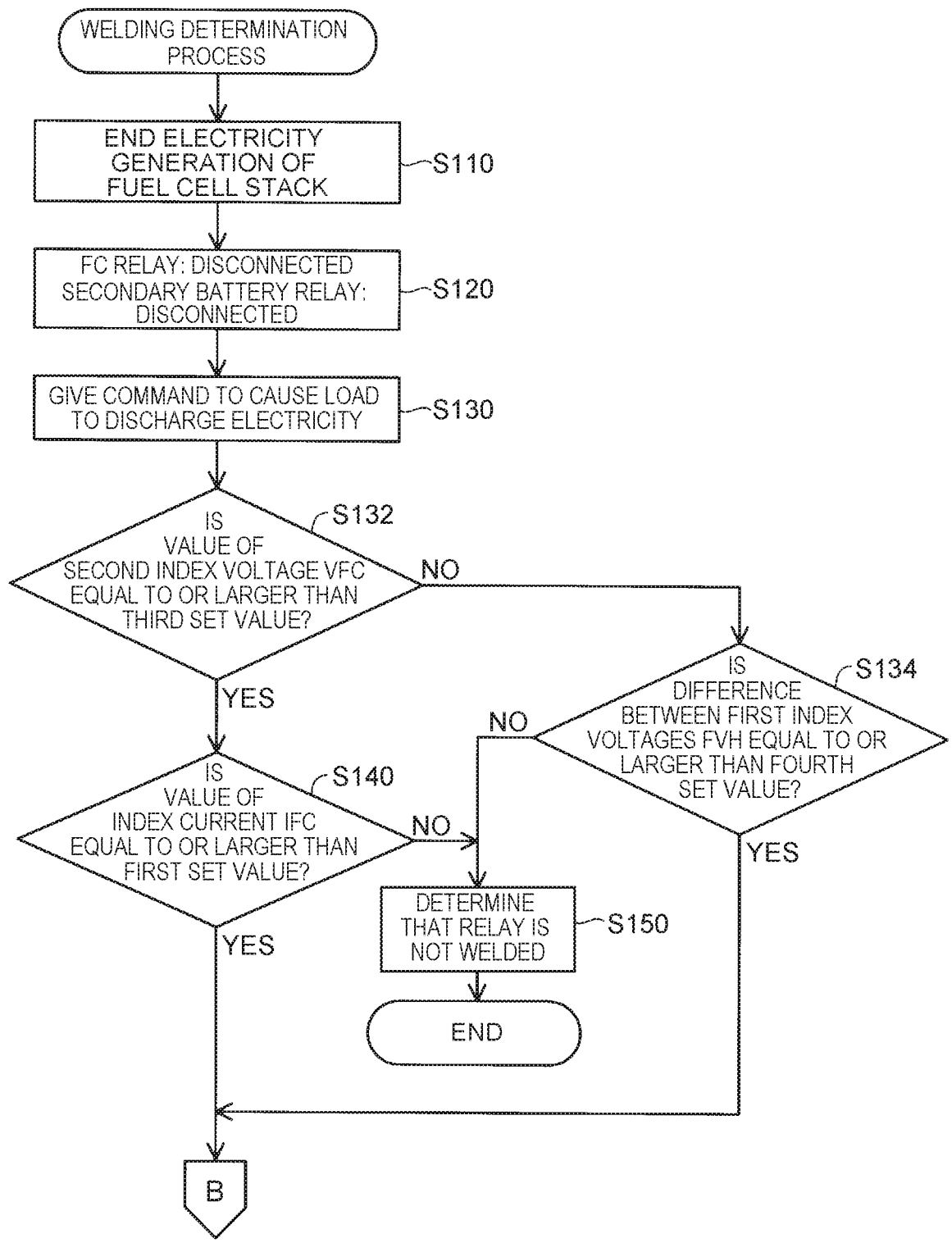
FIG. 5 is a flowchart showing a welding determination process executed by the controller.

FIG. 5 is a flowchart showing an initial determination process executed by the controller 300 of the second embodiment. As shown in FIG. 5, compared with the process steps (step S110 to step S150) of the initial determination process executed by the controller 300 of the first embodiment, the initial determination process executed by the controller 300 of the second embodiment has additional process steps of step S132 and step S134. In the following, only the difference in processing contents from the initial determination process of FIG. 2 will be described. Those parts of FIG. 5 that are the same processing contents as in the initial determination process of FIG. 2 will be denoted by the same reference signs as in FIG. 2, and a detailed description thereof will be omitted. In the description of the initial determination process executed by the controller 300 of the second embodiment, the voltage sensor 115 will be referred to as a second index voltage sensor 115, and the voltage VFC output by the fuel cell 110 will be referred to as a second index voltage VFC.

The controller 300 of the second embodiment causes the drive motor MG2 that is a load to discharge electricity (step S130), and then compares the second index voltage value VFC and a preset third set value (step S132). More specifically, the controller 300 determines whether the second index voltage value VFC is equal to or higher than third set value. In this embodiment, the third set value is 185 V. In another embodiment, the third set value may be a value lower than 185 V or a value higher than 185 V. The third set value is set based on a voltage value VFC at which it is deemed to be highly probable that, due to a low voltage value VFC of the voltage output from the fuel cell 110, a current flows only within a range in which the current detection accuracy of the index current sensor 122 is low. That is, when the second index voltage value VFC does not exceed the third set value, a situation is assumed where a current flows only within a range in which the current detection accuracy of the index current sensor 122 is low. In this embodiment, the determination through the comparison in step S132 can be regarded as a subordinate concept of the comparative determination described in SUMMARY.

When the second index voltage value VFC is equal to or larger than the third set value (step S132: YES), the controller 300 of the second embodiment executes the process steps of step S140 and the subsequent steps described above.

On the other hand, when the second index voltage value VFC does not exceed the third set value (step S132: NO), the controller 300 of the second embodiment determines whether the FC relay 130 is welded by comparing a preset fourth set value and the difference between the first index voltage values FVH before and after electric discharge of the drive motor MG2 (step S134). More specifically, the controller 300 makes this comparison to determine whether the difference between the first index voltage values FVH before and after electric discharge is equal to or larger than the fourth set value. In this embodiment, the fourth set value is 50 V. In another embodiment, the fourth set value may be a value lower than 50 V or a value higher than 50 V. The first index voltage values FVH before and after electric discharge here respectively refer to the first index voltage value FVH at the start of electric discharge and the first index voltage value FVH at the end of electric discharge. In this embodiment, the determination through the comparison in step S134 can be regarded as a subordinate concept of the initial voltage determination described in SUMMARY.

When the second index voltage value VFC does not exceed the third set value (step S132: NO), a situation is assumed where a current flows only within a range in which the current detection accuracy of the index current sensor 122 is low. Therefore, the controller 300 makes the initial voltage determination that is a determination using the first index voltage sensor 125 (step S134).

When the difference between the first index voltage values FVH does not exceed the fourth set value (step S134: NO), the controller 300 of the second embodiment determines that the FC relay 130 is not welded (step S150). In this case, the controller 300 does not execute the re-determination process of FIG. 6. Then, the controller 300 ends the welding determination process.

When the difference between the first index voltage values FVH is equal to or larger than the fourth set value (step S134: YES), the controller 300 deems it indeterminable that the FC relay 130 is not welded, and executes the re-determination process of step S210 and the subsequent steps shown in FIG. 6. If the FC relay 130 has been normally disconnected in step S120, the fuel cell 110 and the PCU 200 are electrically disconnected from each other. Therefore, even when the drive motor MG2 is caused to discharge electricity in step S130, the first index voltage value FVH remains almost the same before and after the electric discharge. However, when, as a result of the drive motor MG2 discharging electricity, the difference between the first index voltage values FVH before and after electric discharge increases to be equal to or larger than the fourth set value, it is highly probable that the FC relay 130 has failed to be disconnected in step S120 due to welding of the FC second main relay FCRG.

Figure 6:
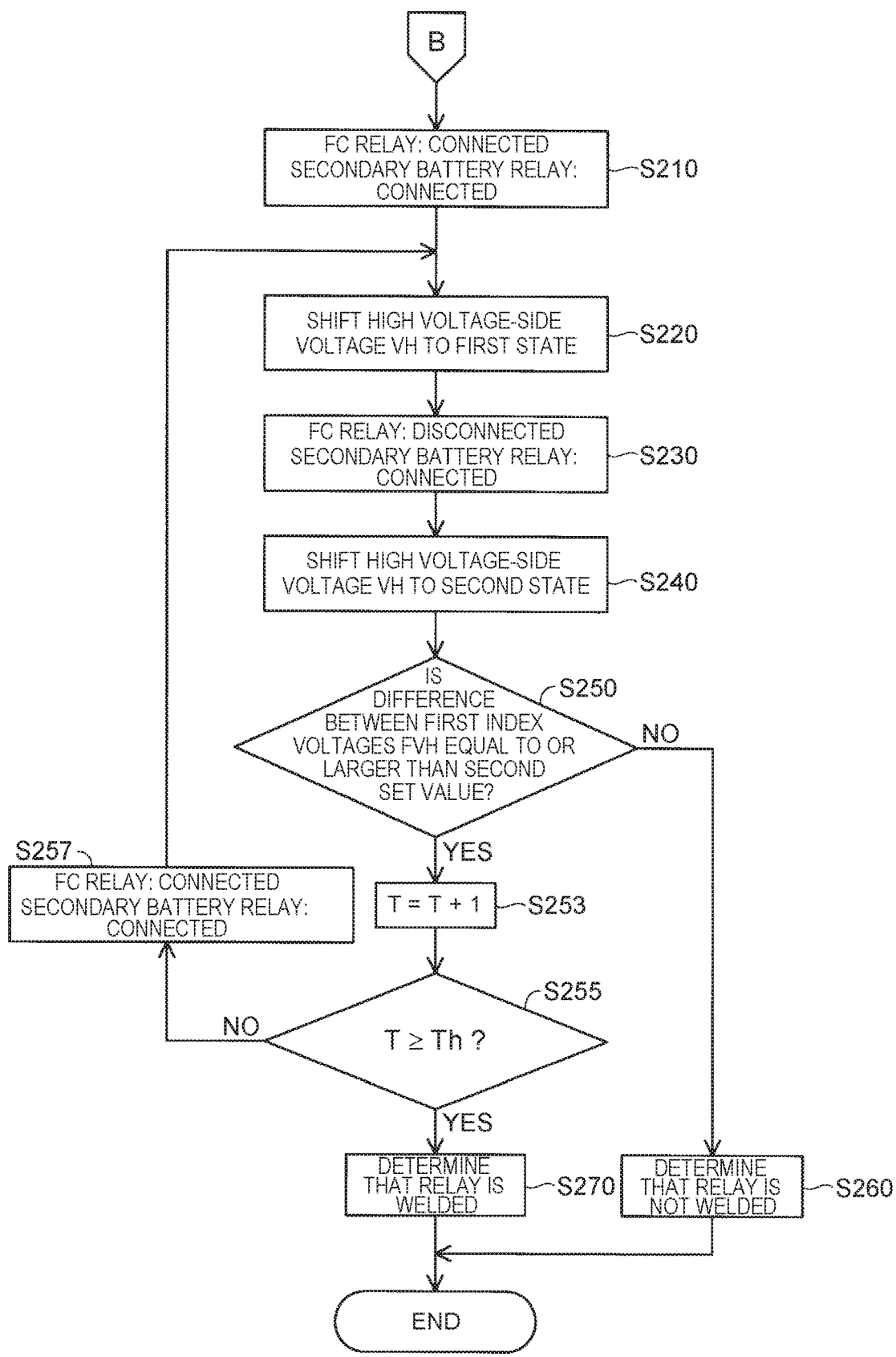
FIG. 6 is a flowchart showing the welding determination process executed by the controller.

As shown in FIG. 6, compared with the process steps (step S210 to step S270) of the re-determination process executed by the controller 300 of the first embodiment, the re-determination process executed by the controller 300 of the second embodiment has additional process steps of step S253, step S255, and step S257. In the following, only the difference in processing contents from the re-determination process of FIG. 3 will be described. Those parts of FIG. 6 that are the same processing contents as in the re-determination process of FIG. 3 will be denoted by the same reference signs, and a detailed description thereof will be omitted. In the re-determination process executed by the controller 300 of the second embodiment, the FC relay 130 is determined to be welded when the event that the difference between the first index voltage values FVH becomes equal to or larger than the second set value repeats itself a set number of times.

When the difference between the first index voltage values FVH is equal to or larger than the second set value (step S250: YES), the controller 300 of the second embodiment increases a counter value T by one (step S253). The counter value T is zero at a point when the welding determination process is started.

After increasing the counter value T (step S253), the controller 300 of the second embodiment determines whether the counter value T is equal to or larger than a set number of times Th (step S255). In this embodiment, the set number of times Th is two.

When the counter value T is equal to or larger than the set number of times Th (step S255: YES), the controller 300 of the second embodiment determines that the FC relay 130 is welded (step S270). Then, the controller 300 of the second embodiment ends the welding determination process.

When the counter value T does not exceed the set number of times Th (step S255: NO), the controller 300 of the second embodiment connects the FC relay 130 and the secondary battery relay 150 (step S257), and executes the process of step S220 and the subsequent steps again. In step S257, the controller 300 of the second embodiment connects the FC relay 130 and the secondary battery relay 150 by connecting the FC relay 130 again that has been disconnected in step S230.

FIG. 7 is a timing chart illustrating changes in state from when the supply of a hydrogen gas and air to the fuel cell 110 is stopped until when the welding determination process is ended. The contents from timing t1 to timing t6 in FIG. 7 are the same as the contents from timing t1 to timing t6 in FIG. 4. In the following, only the difference from the timing chart of FIG. 4 will be described.

When the counter value T does not exceed the set number of times Th (step S255: NO) after the second set value and the difference between the first index voltage value FVH in the first state and the first index voltage value FVH in the second state are compared (step S250) at timing t6 in FIG. 7, the FC relay 130 is shifted to a connected state (step S257) during the period from timing t7 to timing t8 in FIG. 7. In this case, the FC second main relay FCRG is electrically connected.

The process from timing t8 to timing t10 in FIG. 7 is the same as the process from timing t4 to timing t6 in FIG. 4. At timing t10 or later in FIG. 7, the second set value and the difference between the first index voltage value FVH in the first state and the first index voltage value FVH in the second state are compared (step S250). The process from timing t8 to timing t10 in FIG. 7 is repeated until either of the following conditions is met: that the difference between the first index voltage values FVH is determined to be equal to or larger than the second set value consecutively the set number of times Th or more; and that the difference between the first index voltage values FVH is determined not to exceed the second set value.

According to the second embodiment having been described above, the initial voltage determination that is a determination using the first index voltage value FVH is made in the initial determination process, when it is highly probable that, due to a low voltage value VFC of the voltage output from the fuel cell 110, a current flows only within a range in which the current detection accuracy of the index current sensor 122 is low. Thus, whether the FC relay 130 is welded is determined by the re-determination (step S250) and the initial voltage determination (step S134) that are different determinations using the first index voltage value FVH, which can enhance the accuracy of detecting a welding failure of the FC relay 130.

According to the second embodiment, it is not determined that the FC relay 130 is welded unless the difference between the first index voltage value FVH in the first state and the first index voltage value FVH in the second state is determined to be equal to or larger than the second set value consecutively the set number of times Th or more in step S250 of the re-determination process. Thus, a situation can be avoided where the FC relay 130 is determined to be welded based on a false detection due to a failure of the first index voltage sensor 125 or to noise detection.

C. Other Embodiments

In the first embodiment described above, the secondary battery relay 150 is disposed between the secondary battery 140 and the second converter 210 constituting a part of the PCU 200. However, the present disclosure is not limited to this example. For example, the secondary battery relay 150 may be disposed at an arbitrary position between the secondary battery 140 and the inverter 220, as long as the secondary battery relay 150 switches between a connected in which the secondary battery 140 and the inverter 220 are electrically connected to each other and a disconnected state in which the secondary battery 140 and the inverter 220 are electrically disconnected from each other.

In the first embodiment described above, the secondary battery 140 is provided as the electricity storage unit. However, the electricity storage unit is not limited to the secondary battery 140, and an arbitrary type of electricity storage unit that can supply electricity, such as an electricity storage device formed by a capacitor, may be provided. In the first embodiment described above, the fuel cell system 10 includes the second converter 210 as the voltage control device. However, the voltage control device is not limited to the second converter 210, and the fuel cell system 10 may include an arbitrary type of voltage control device that can control a voltage input from the electricity storage unit, such as a resistor voltage divider. In the case where a resistor voltage divider is provided as the voltage control device, an aspect is assumed in which, to boost the high voltage-side voltage VH to the first voltage, electricity is supplied to the high voltage-side voltage VH so as to bypass the resistor voltage divider, and to step down the high voltage-side voltage VH from the first voltage to the second voltage, electricity is supplied to the high voltage-side voltage VH via the resistor voltage divider.

In the first embodiment described above, the switching element constituting a part of the first converter 120 is switched off when electricity generation of the fuel cell 110 is ended (step S110) in the initial determination process. However, the present disclosure is not limited to this example. For example, the switching element constituting a part of the first converter 120 may be kept on when electricity generation of the fuel cell 110 is ended (step S110) in the initial determination process. "On" here means a state where the switching element is kept on, and not a state where periodical switching control is performed.

In the first embodiment described above, the controller 300 executes the welding determination process to determine whether the FC second main relay FCRG of the FC relay 130 is welded. However, the present disclosure is not limited to this example. For example, the controller 300 may execute the welding determination process to determine whether the FC first main relay FCRB of the FC relay 130 is welded. In this case, the controller 300 disconnects the FC relay 130 in step S120 and step S230 by electrically disconnecting the FC first main relay FCRB of the FC relay 130 while keeping the FC second main relay FCRG thereof electrically connected.

In the first embodiment described above, when the controller 300 determines that the FC relay 130 is welded, the controller 300 causes the notification unit 310 to give a notification to that effect. However, the present disclosure is not limited to this example. For example, when the controller 300 has determined whether the FC relay 130 is welded, the controller 300 may leave the determination result as a record that can be checked by an inspector, or the controller 300 may command the fuel cell system 10 to make a repair based on the determination result, without outputting a notification that the relay is welded or a notification that the relay is not welded.

In the second embodiment described above, the controller 300 compares the second index voltage value VFC and the preset third set value (step S132) after causing the drive motor MG2 that is a load to discharge electricity (step S130). However, the present disclosure is not limited to this example. For example, the controller 300 may cause the drive motor MG2 to discharge electricity (step S130) after comparing the second index voltage value VFC and the preset third set value (step S132). In this case, the controller 300 compares the difference between the first index voltage values FVH before and after electric discharge and the preset fourth set value (step S134) after causing electric discharge (step S130).

The present disclosure is not limited to the above embodiments but can be implemented in various configurations without departing from the gist of the disclosure. For example, the technical features in the embodiments corresponding to the technical features in the aspects described in SUMMARY can be replaced or combined as appropriate in order to solve some or all of the above problems or to achieve some or all of the above effects. Unless a technical feature is described as being essential in the specification, the technical feature can be omitted as appropriate.

What is claimed is:

1. A fuel cell system comprising:
   a fuel cell;
   a converter that boosts a voltage input from the fuel cell and outputs the boosted voltage;
   an electricity storage unit configured to store electricity;
   a voltage control device that is connected to a line on an output side of the converter and configured to be able to control a voltage input from the electricity storage unit and supply the voltage input from the electricity storage unit to the line;
   a drive circuit that is connected to the line and drives a load;
   a relay that is disposed between the converter and a position at which the voltage control device is connected to the line, and switches between a connected state in which the fuel cell and the drive circuit are electrically connected to each other and a disconnected state in which the fuel cell and the drive circuit are electrically disconnected from each other;
   an index current acquisition unit configured to acquire an index current value between the relay and the fuel cell;
   a first index voltage acquisition unit configured to acquire a first index voltage value between the relay and the converter; and
   a controller,
   wherein the controller is configured to:
      when the fuel cell system is to be stopped, make an initial current determination of determining whether the relay is welded, by creating a state where electricity is not supplied from the voltage control device and disconnecting the relay, and then comparing a first set value and the index current value that is acquired after transmitting a signal to the drive circuit to cause the load to discharge electricity;
      when the initial current determination finds that the index current value does not exceed the first set value, determine that the relay is not welded;
      when the initial current determination finds that the index current value is equal to or larger than the first set value, deem it indeterminable that the relay is not welded, and make a re-determination by creating a state where electricity is supplied from the voltage control device and connecting the relay to shift a high voltage-side voltage between the voltage control device and the drive circuit to a first state of having been boosted to a first voltage, and then disconnecting the relay while maintaining the state where electricity is supplied from the voltage control device to shift the high voltage-side voltage to a second state of having been stepped down to a second voltage lower than the first voltage, and then comparing a second set value and a first difference that is a difference between the first index voltage value in the first state and the first index voltage value in the second state; and
      when the re-determination finds that the first difference is equal to or larger than the second set value, determine that the relay is welded.

2. The fuel cell system according to claim 1, further comprising a second index voltage acquisition unit configured to acquire a second index voltage value between the fuel cell and the converter,
   wherein the controller is configured to:
      when the fuel cell system is to be stopped, make a comparative determination of comparing the second index voltage value and a third set value at a timing of after creating a state where electricity is not supplied from the voltage control device and disconnecting the relay and before making the initial current determination;
      when the comparative determination finds that the second index voltage value is equal to or larger than the third set value, make the initial current determination;
      when the comparative determination finds that the second index voltage value does not exceed the third set value, make an initial voltage determination of determining whether the relay is welded by comparing a fourth set value and a second difference that is a difference between the first index voltage values before and after electric discharge in response to the signal;
      when the initial voltage determination finds that the second difference does not exceed the fourth set value, determine that the relay is not welded; and when the initial voltage determination finds that the second difference is equal to or larger than the fourth set value, deem it indeterminable that the relay is not welded, and make the re-determination.

3. The fuel cell system according to claim 1, further comprising a notification unit configured to give a notification that the relay is welded, wherein the controller is configured to cause the notification unit to give the notification that the relay is welded when the controller determines that the relay is welded.

* * * * *

UNITED STATES PATENT AND TRADEMARK OFFICE
CERTIFICATE OF CORRECTION

PATENT NO. : 10,654,376 B2
APPLICATION NO. : 16/224090
DATED : May 19, 2020
INVENTOR(S) : Keiichi Toriumi It is certified that error appears in the above-identified patent and that said Letters Patent is hereby corrected as shown below:

On the Title Page

Item (72), inventor city, delete "Okazaki" and insert --Okazaki-shi Aichi-ken--, therefor.

Signed and Sealed this
Seventh Day of July, 2020

Andrei Iancu
*Director of the United States Patent and Trademark Office*